United States Patent
Martin

(10) Patent No.: US 7,461,941 B2
(45) Date of Patent: Dec. 9, 2008

(54) UNINTERRUPTED POWER SUPPLY FOR PROJECTION LAMP PROTECTION

(75) Inventor: Demian Martin, San Leandro, CA (US)

(73) Assignee: Monster Cable Products, Inc., Brisbane, CA (US)

( * ) Notice: Subject to any disclaimer, the term of this patent is extended or adjusted under 35 U.S.C. 154(b) by 713 days.

(21) Appl. No.: 11/029,030

(22) Filed: Jan. 3, 2005

(65) Prior Publication Data

US 2006/0146478 A1    Jul. 6, 2006

(51) Int. Cl.
*F21V 29/00* (2006.01)
*G03B 21/16* (2006.01)

(52) U.S. Cl. .......................... 353/85; 353/52; 353/122; 348/748

(58) Field of Classification Search .................. 353/121, 353/122, 42, 43, 52, 85; 348/748; 362/264, 362/294
See application file for complete search history.

(56) References Cited

U.S. PATENT DOCUMENTS

| | | | |
|---|---|---|---|
| 5,136,397 A | 8/1992 | Miyashita | |
| 6,588,907 B1 * | 7/2003 | Billington et al. | 353/57 |
| 6,698,898 B2 | 3/2004 | Terami et al. | |
| 6,992,811 B2 * | 1/2006 | Williams et al. | 359/291 |
| 7,086,739 B2 * | 8/2006 | Kida et al. | 353/52 |
| 2005/0057542 A1 * | 3/2005 | Plut | 345/204 |
| 2006/0092383 A1 * | 5/2006 | Vinson et al. | 353/69 |

* cited by examiner

*Primary Examiner*—Andrew T Sever
(74) *Attorney, Agent, or Firm*—LaRiviere, Grubman & Payne, LLP

(57) ABSTRACT

An apparatus and method for protecting projection lamps 3 in computer monitors, projection television receivers, video projectors 15, game displays and the like which incorporates a sensor 2 connected to a receiver 6 in an uninterruptible power supply 1. Sensor 2 detects when the power has been interrupted to lamp 3 and initiates a supply of power to a cooler 8 in projector 15 to the device containing the lamp 3 and begins a normal shut down protocol. The shut down protocol maintains cooling to lamp 3 allowing lamp 3 to cool to a temperature where power may safely be discontinued.

14 Claims, 1 Drawing Sheet

UNINTERRUPTED POWER SUPPLY FOR PROJECTION LAMP PROTECTION

TECHNICAL FIELD

The present invention relates to uninterrupted power supply systems and methods. More particularly, the present invention relates to methods and apparatus for protecting projection lamps in the event of a power supply interruption. With still greater particularity, the present invention relates to protecting projection lamps in wide screen television receivers and monitors from thermal damage in the event of a power interruption.

BACKGROUND ART

The largest trend in consumer electronics is the growing popularity of wide video screen display. Such displays are particularly desirable for Digital Television (DTV) and High Definition Television (HDTV). These displays are used for television reception, computer monitors and as game displays. There are several types of such receivers/monitors in current use such as plasma displays, liquid crystal displays, and projection displays. Projection displays include video projectors which project onto the front of a reflective screen and internal projectors, which include lenses and mirrors to project an image on the rear of a translucent screen. Projectors may include Liquid Crystal Displays (LCD), Digital Light Processing (DLP), Liquid Crystal on Silicon (LCOS), and Direct Drive Image Light Amplifier (DILA) image elements to convert an electronic signal to a visual image. In all projection monitors light from a projection lamp is directed toward the image element and then allowed to produce the image on the screen. Projection lamps are specialized to produce a bright image of uniform brightness. This design restraint has made the projection lamps quite expensive. Such a lamp commonly retails from $100 to $1000. A cooler, such as a fan, provides cooling during operation to prevent the lamp from overheating. In order to protect the lamp, all such devices further include a shut down protocol wherein when the power is shut off the cooler is still powered for a predetermined amount of time until the lamp has cooled. When there is a power failure the lamp can often overheat resulting in destruction of the lamp due to the fact that the cooler immediately shuts down while the lamp retains a high temperature.

Uninterruptible Power Systems (UPS) are unable to prevent this destruction. UPS include a plurality of rechargeable batteries and circuitry to sense a loss of power and use the batteries for power a brief period of time. UPS are commonly used in computer systems to allow hard disk drives to continue operation after a brief interruption of normal power, or allow the user to follow a normal shut down when power is interrupted to computer systems. The capacity of such UPS systems is insufficient to properly power down a large projection lamp. On the other hand, if a UPS has sufficient power to power the lamp, it will continue to power the lamp and the cooler until it exhausts its power capacity then both will stop, delaying but not preventing damage. Such UPS systems provide no means for monitoring lamp operation and allowing protection in the event of an interruption of supply power.

DISCLOSURE OF THE INVENTION

The present invention addresses the current needs for a system which protects projection lamps in the event of a power failure. The system provides driving currents and voltages to a wide variety of cooling systems. The alternating current consumption of the projector where the lamp is located is monitored to detect loss of power and provide alternative power when a power failure is detected. The normal shut down protocol is preserved.

The first step of the method is to establish a baseline for normal lamp operation. This baseline is then stored. Next, a second baseline is learned for a "power off" condition. The devices learn the normal shut down procedure for the device it is connected to and stores this information. This includes monitoring the power draw from the projector and sensing when it decreases as it would when the lamp is shut down. If it does not respond in the appropriate time, the shut down command is repeated until the projector does shut down. In operation the UPS monitors the power. When the power fails the UPS sends the learned command sequence to the projector's remote input via a separate or contained LED IR transmitter. The UPS continues the monitoring of the power consumption and repeats the sequence until it senses the reduction of power from the lamp having been shut down and then can maintain the power to the projector until the fan cooling system has timed out as it normally does under its normal shut down sequence. The UPS continues to supply power to the projectors cooling system until it also shuts down. The system then resets itself upon resumption of power.

The apparatus of the invention includes an Uninterruptible Power Supply (UPS) equipped with a "learning" IR receiver and an IR transmitter capable of working with conventional remote codes. The IR transmitter transmits the "power" or "power off" code that it was "taught" when the incoming power fails. The UPS monitors the power consumption and repeats the code until it senses the reduction of power from the lamp having been shut down and then can maintain the power to the projector until the fan cooling system has timed out as it normally does under its normal shut down sequence. This will protect the lamp from excess thermal stress on unexpected shutdown and can extend the life of the lamp.

BRIEF DESCRIPTION OF THE DRAWING(S)

For a better understanding of the present invention, reference is made to the below referenced accompanying drawings. Reference numbers refer to the same or equivalent parts of the present invention throughout the several figures of the drawings.

MODES FOR CARRYING OUT THE INVENTION

Figure 1:
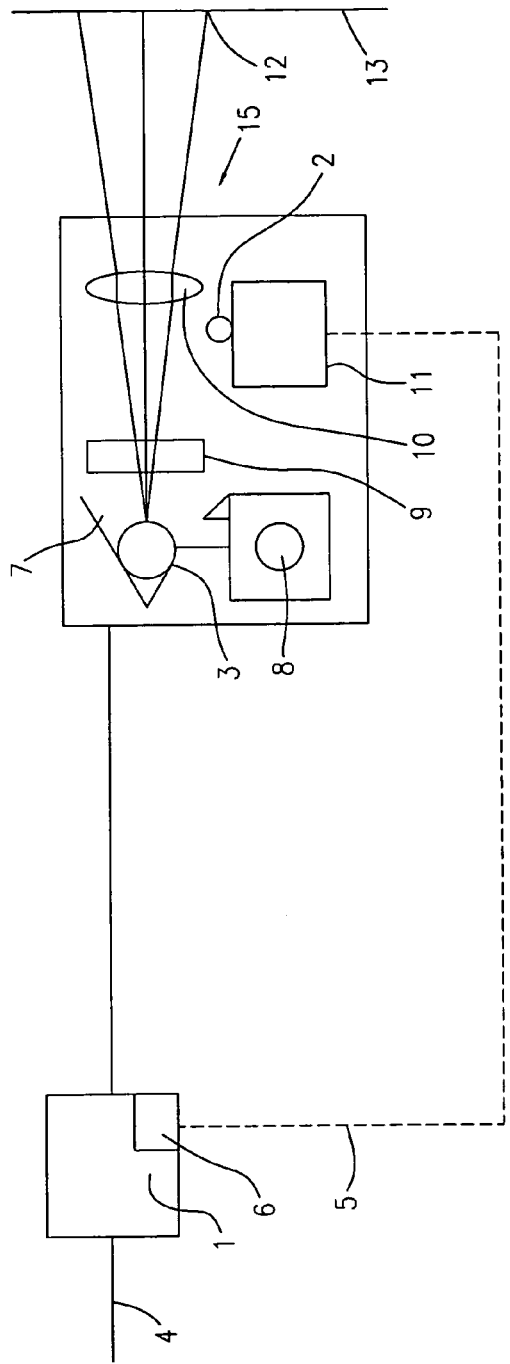
FIG. 1 is a block diagram of a first embodiment of the circuit, in accordance with the present invention.

FIG. 1 is a block diagram of a first embodiment of the circuit in accordance with the present invention. An uninterruptible power supply 1 (UPS) is connected to an external source of electrical power such as 117 volt AC outlet. UPS 1 may be a home entertainment UPS similar to the Home Theatre PowerCenter™ HT UPS 1000 Uninterruptible Power Supply manufactured by Monster Cable Products, Inc. of Brisbane, Calif. UPS 1 as described in this embodiment further includes a "smart" infrared receiver 6 which is capable of remembering signals 5 received. UPS 1 learns the "off" or "power" command from the user's remote, by the user directing the remote to the sensor in the front of UPS 1 and pressing the command after pressing the "learn" button on the UPS. Receiver 6 thus memorizes the shut down protocol for any projector or display to which it is connected. A projector 15 is connected to UPS 1 which supplies projector 15 with a source of uninterruptible power. Projector 15 is illustrated as a standard video projector but similar projection displays include video projectors which project onto the front of a reflective screen and internal projectors which include lenses and mirrors to project an image on the rear of a translucent screen. Projectors may include Liquid Crystal Displays (LCD), Digital Light Processing (DLP), Liquid Crystal on Silicon (LCOS), and Direct Drive Image Light Amplifier (DILA) image elements to convert an electronic signal to a visual image. All such displays include a projection bulb 3 which is typically surrounded by a reflector/shroud 7. A cooling device 8 is connected to reflector/shroud 7 cool bulb 3 during operation. Cooling device 8 is often a fan but in some cases a thermionic cooler or liquid cooler may be used. Light from projection lamp 3 next passes through or reflects off of an image element 9. Image element 9 may be a Liquid Crystal Displays (LCD), Digital Light Processing (DLP), Liquid Crystal on Silicon (LCOS), or Direct Drive Image Light Amplifier (DILA) dependant upon application. A lens 10 projects the image 12 onto a screen 13. A sensor 2 senses the operation and power consumption of projection lamp 3 by monitoring the power consumption of the projector. Sensor 2 could be an electrical sensor in UPS 1 monitoring the power consumption of the projector. If sensor 2 determines that the power consumption of the projector using lamp 3 has declined below normal operation standards, a signal activates a transmitter 11 of the condition. Transmitter 11 is an infrared remote control transmitter in this embodiment, but could also be a radio link or even a hard wired connection to receiver 6 in UPS 1. The invention contemplates that a signal 5 is identical to the "power" or "power off" signal sent by a remote control for projector 15. Upon receipt of signal 5 receiver 6 begins the normal shut down procedure of projector 15. This allows cooler 8 to continue to receive power while lamp 3 does not receive power. Sensor 2 continues to monitor the situation until lamp 3 has safely cooled.

Figure 2:
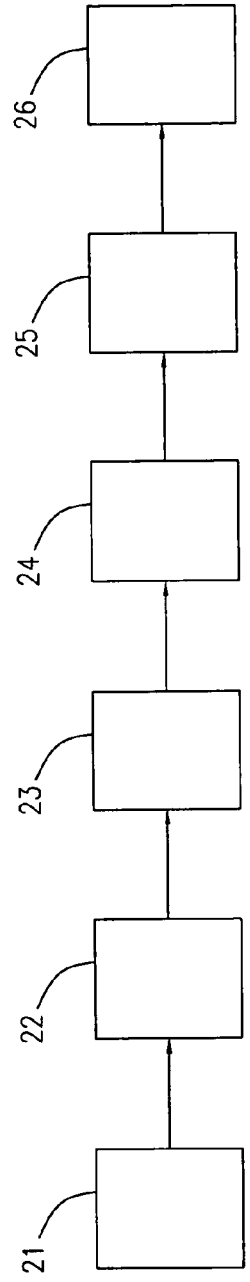
FIG. 2 is a block diagram of the method of the FIG. 1 embodiment, in accordance with the present invention.

FIG. 2 is a block diagram of the method of the FIG. 1 embodiment, in accordance with the present invention. The method first step 21 is to allow the receiver to memorize the shut down protocol of the projector. This may be easily accomplished by simply turning the projector on and allowing it to begin operation then pressing the "power" or "power off" button on the remote control. In projectors without a remote control, this is accomplished by pressing the "power" switch to the "off" position. The receiver will remember how a given projector shuts down. Normally, power is immediately cut off to the lamp and power supplied to a cooling fan for a given period, typically a couple minutes. This allows the lamp to cool to a safe temperature. The next step 22 is to monitor the power consumption. If power is interrupted to the projector, there will be a reduction of power consumption. When this situation is indicated the next step 23 is to send a shut down signal. As described above, this signal is identical to the signal used to turn off a given projector. Step 24 then initiates the shut down protocol memorized in step 21 supplying power to the cooler and cutting power off to the projection lamp. The sensor continues to monitor 25 lamp temperature until it has safely cooled. When the lamp has safely cooled, the method returns 26 the system to its initial settings.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, various changes and modifications in form, material, and fabrication detail can be made without departing from the spirit and scope of the inventions as set forth in the appended claims should be readily apparent to those of ordinary skill in the art. No claim herein is to be construed under the provisions of 35 U.S.C. § 112, sixth paragraph, unless the element is expressly recited using the phrase "means for."

INDUSTRIAL APPLICABILITY

The present invention applies industrially to projection display systems and methods. More particularly, the present invention applies industrially to Computer Monitors, Television Receivers, Audio Video Systems and Video Gaming Systems. Even more particularly, the present invention applies industrially to the present invention applies industrially to Computer Monitors, Television Receivers, Audio Video Systems and Video Gaming Systems with projection lamps.

What is claimed:

1. A device for preventing damage to projection lamps in projectors having a cooling system and a shut down protocol on loss of external power comprising:
    an uninterruptible power supply connected to the projector for providing power in the event of loss of external power,
    a sensor for monitoring projector operation connected to said uninterruptible power supply,
    a memory connected to said uninterruptible power supply for storing the projector shut down protocol, and
    wherein when said sensor detects a loss of power to said projector the shut down protocol stored in said memory initiates the shut down protocol in the projector and said uninteruiptible power supply,
    further comprising an infrared receiver connected to said uninterruptible power supply and an infrared transmitter configured to detect a cessation of power to said projector,
    wherein said infared transmitter transmits remote control codes and said infrared receiver is capable of receiving said remote control codes.

2. A device as in claim 1, wherein said infrared receiver is a learning receiver which memorizes the shut down protocol of the projector.

3. A device as in claim 2, wherein said infrared transmitter transmits a code selected from the "power"and "power off-"codes that it was "taught " when the external power fails.

4. A device as in claim 3, wherein said uninterruptible power supply monitors the power consumption and repeats the code until it senses the reduction of power from the lamp having been shut down and then can maintain the power to the projector until the cooling system has timed out as it normally does under its normal shut down protocol.

5. A device as in claim 4, wherein said cooling system is a fan.

6. A device as in claim 2, wherein said infrared transmitter is connected to the projector.

7. A method for preventing damage to projection lamps in projectors having a cooling system and a shut down protocol on loss of external power comprising:
 storing the projector shut down protocol,
 monitoring projector operation for loss of external power,
 providing power in the event of loss of external power,
 initiating said stored projector shut down protocol in the event of the loss of external power,
 continuing said steps until said lamp has safely cooled
 wherein said monitoring step is performed by an infrared sensor,
 wherein said initiation step is performed by transmitting an infrared signal upon cessation of power to said projector lamp.

8. A method as in claim 7, wherein said infrared signal is a remote control code.

9. A method as in claim 8, wherein said infrared signal is received by a receiver that memorized the shut down protocol of the projector.

10. A method as in claim 9, wherein said infrared signal is a code selected from the "power" and "power off" codes that it was "taught" when the external power fails.

11. A method as in claim 10, wherein said code is repeatedly sent until the reduction of power from the lamp indicates that it has been shut down and maintains the power to the projector until the cooling system has timed out as it normally does under its normal shut down protocol.

12. A method as in claim 11, wherein said cooling system is a fan.

13. A method as in claim 10, wherein said signal is from a transmitter connected to the projector.

14. A uninterruptible power supply device for preventing damage to projection lamps in projectors having a cooling system and a shut down protocol on loss of external power comprising:
 an stored supply of electrical potential connected to the projector for providing power in the event of loss of external power,
 a sensor for monitoring projector operation connected to said projector and capable of transmitting remote control codes to said uninterruptible power supply,
 a remote control code receiver having a memory connected to said uninterruptible power supply for storing the projector shut down protocol, and
 wherein when said sensor detects a loss of power to said projector a remote control code is transmitted to said receiver the initiating the shut down protocol in the projector and said uninterruptible power supply.

\* \* \* \* \*